US011281695B2

(12) United States Patent
Narayanan et al.

(10) Patent No.: US 11,281,695 B2
(45) Date of Patent: Mar. 22, 2022

(54) PARTITIONING A TEMPORAL GRAPH FOR DISTRIBUTED STORAGE

(71) Applicant: Cisco Technology, Inc., San Jose, CA (US)

(72) Inventors: Bhalaji Narayanan, Bangalore (IN); Arun Kumar Raghavendra, Bangalore (IN); Ramesh Nethi, Bangalore (IN); Venkata Lakshmi Narayana Mehar Simhadri, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 260 days.

(21) Appl. No.: 16/752,042

(22) Filed: Jan. 24, 2020

(65) Prior Publication Data
US 2021/0232601 A1 Jul. 29, 2021

(51) Int. Cl.
*G06F 16/27* (2019.01)
*H04L 43/065* (2022.01)
*H04L 43/062* (2022.01)
*G06F 16/901* (2019.01)

(52) U.S. Cl.
CPC ........ *G06F 16/278* (2019.01); *G06F 16/9024* (2019.01); *H04L 43/062* (2013.01); *H04L 43/065* (2013.01)

(58) Field of Classification Search
CPC . G06F 16/278; G06F 16/9024; H04L 43/062; H04L 43/065; H04L 41/12; H04L 43/067
USPC .......................................................... 707/755
See application file for complete search history.

(56) References Cited

U.S. PATENT DOCUMENTS

| | | | |
|---|---|---|---|
| 2005/0223092 A1* | 10/2005 | Sapiro | H04L 41/0681 709/224 |
| 2013/0232433 A1* | 9/2013 | Krajec | G06F 11/323 715/771 |
| 2015/0295779 A1* | 10/2015 | Ching | H04L 43/022 715/733 |
| 2018/0367414 A1* | 12/2018 | Raghavendra | H04L 43/0817 |

* cited by examiner

*Primary Examiner* — Hicham Skhoun
(74) *Attorney, Agent, or Firm* — Polsinelli PC

(57) ABSTRACT

In one embodiment, present disclosure discloses a method for partitioning a temporal graph is described. Embodiments of the method comprises creating a plurality of storage blocks for each type of the different types of graph elements based on predefined label groups, each of the plurality of storage blocks configured to store the telemetry information generated in a corresponding predefined time-range, recreating each of the plurality of storage blocks upon expiry of a configurable rollover time, and sharding each of the plurality of storage blocks into a plurality of shards based on a configurable sharding count.

20 Claims, 9 Drawing Sheets

PARTITIONING A TEMPORAL GRAPH FOR DISTRIBUTED STORAGE

FIELD OF THE INVENTION

The present disclosure relates generally to computer networks, and more specifically, to method and system for partitioning temporal graphs for distributed storage of network telemetry information.

BACKGROUND

Time-series analytics of network telemetry information is a field of active study. With expanding computer networks and increasing speed, volume, and types of data traffic on the computer networks, there is a demand to collect, store, and analyze metrics information from the computer networks in order to identify trends related to network conditions and traffic patterns. Further, the analysis of telemetry information can also help network administrators improve operational efficiency of the networks and improve the user experience of users on the networks.

Currently, network data analytics systems, which are configured to process and store unbounded streams of telemetry information, result in extraordinarily large and unmanageable data sets. As a result, the process of storing and retrieving the processed data becomes a tedious task. Some of the existing network data analytics systems address the above issue using temporal graphs to efficiently store the unbounded streams of telemetry information. However, proper partitioning of the temporal graph structure is necessary to further enhance efficiency of storing and retrieving the processed data.

DESCRIPTION OF EXAMPLE EMBODIMENTS

Figure 1:
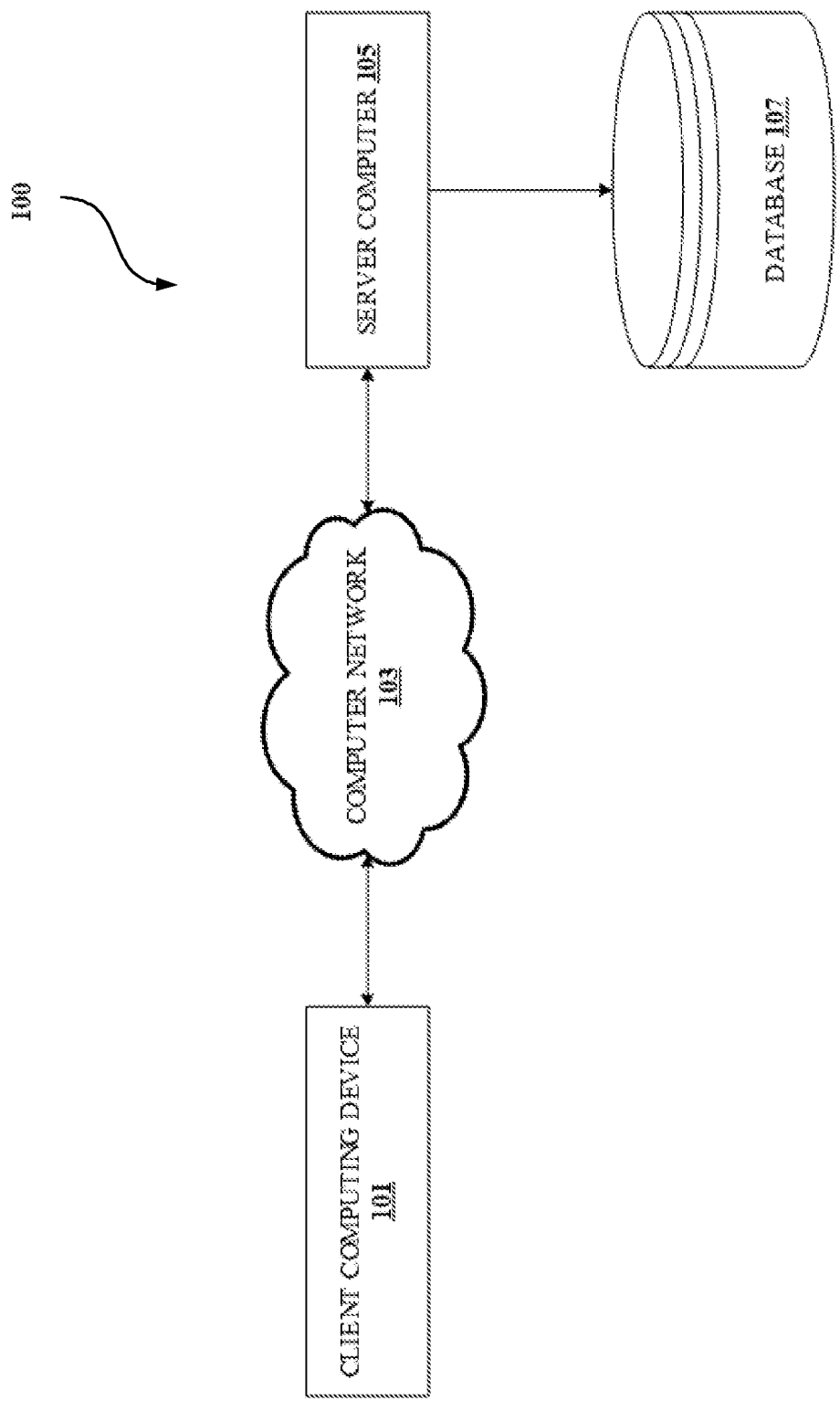
FIG. 1 is a diagram of an example environment in which the techniques described herein may be implemented, according to various embodiments of the present disclosure.

In the following description, for the purposes of explanation, numerous specific details are set forth in order to provide a thorough understanding of the present disclosure. It will be apparent that the present disclosure may be practiced without these specific details. In other instances, well-known structures and devices are shown in block diagram form in order to avoid unnecessarily obscuring the present disclosure.

The text of the present disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the embodiments claimed herein.

Overview:

In an example embodiment, the present disclosure is related to partitioning a temporal graph comprising different types of graph elements including vertices and edges, for storing telemetry information of a computer network. The partitioning comprises creating a plurality of storage blocks for each type of the different types of graph elements based on predefined label groups. Further, each of the plurality of storage blocks may be configured to store the telemetry information generated in a corresponding predefined time-range. Also, each of the plurality of storage blocks may be recreated upon expiry of a configurable rollover time. The partitioning further comprises sharding each of the plurality of storage blocks into a plurality of shards based on a configurable sharding count.

In another example embodiment, the present disclosure pertains to writing telemetry information into a partitioned temporal graph. The method comprises receiving telemetry information of a computer network for storing in the partitioned temporal graph. Further, the method comprises extracting information, comprising type of the graph elements, labels corresponding to the graph elements and element identifiers corresponding to the labels of the graph elements, from the telemetry information. The method further comprises identifying one or more storage blocks from a plurality of storage blocks of the temporal graph based on labels corresponding to the graph element, and identifying one or more shards from a plurality of shards, comprised in the identified one or more storage blocks, based on the element identifiers corresponding to the labels of the graph elements. Finally, the method comprises writing the telemetry information into the identified one or more shards of the plurality of shards.

Example Embodiments

In some embodiments, the present disclosure discloses computer-implemented techniques for partitioning temporal graphs, which may be used for efficiently storing and retrieving telemetry information received from a computer network. The temporal graph may be traversed and/or graph elements may be retrieved to generate network analytics information.

In some embodiments, the telemetry information may comprise network device state information for all internetworking network devices and network state information, such as traffic flow information, for data packets flowing through the computer network. The telemetry information may be transformed into a temporal graph that is digitally stored in a computer memory. Further, the temporal graph may comprise a plurality of graph elements including a plurality of vertices and a plurality of edges. Each vertex may represent an internetworking device, and each edge may represent a data packet flow, or a portion thereof, through the network. Additionally, or alternatively, the temporal graph may comprise a subsequent modification time value specifying a modification time associated with a subsequent version of each graph element.

FIG. 1 illustrates an example environment 100 in which the techniques described herein may be implemented, according to various embodiments of the present disclosure.

In some embodiments, the environment 100 may comprise a plurality of components that may be implemented at least partially by hardware at one or more computing devices, such as one or more hardware processors executing stored program instructions stored in one or more memories for performing the functions that are described herein. In other words, in some embodiments, all functions described herein are intended to indicate operations that are performed using programming in a special-purpose computer or general-purpose computer, in various embodiments. FIG. 1 may illustrate only one of many possible arrangements of components configured to execute the programming described herein. Other arrangements may include fewer or different components, and the division of work between the components may vary depending on the arrangement.

In some embodiments, the environment 100 may include a client computing device 101 that is coupled to a server computer 105 via a computer network 103. The server computer 105 may be, in turn, coupled to a database 107. In some embodiments, the client computing device 101 may be any computing device, such as a laptop, hand-held computer, wearable computer, cellular or mobile phone, Portable Digital Assistant (PDA), or tablet computer.

Although a single client computing device 101 is depicted in FIG. 1, any number of mobile computing devices may be present in the environment 100. In some embodiments, the client computing device 101 may also include other hardware elements, such as one or more input devices, memory, processors, and the like, which are not depicted in FIG. 1. Further, the client computing device 101 may also include applications, software, and other executable instructions to facilitate various aspects of embodiments described herein. These applications, software, and other executable instructions may be installed by a user, owner, manufacturer, or other entity related to the client computing device 101.

In some embodiments, the client computing device 101 may include a client application (not shown in FIG. 1), that displays network analytics application and/or a database console for interacting with the server computer 105. Further, the network analytics application may be configured to implement functional calls, callbacks, methods, or other programmatic means for contacting the server computer 105 to obtain temporal graph data, network analytics information, and other data that may form a basis for analyzing the network telemetry information.

In some embodiments, the computer network 103 may comprise any combination of a Local Area Network (LAN), a Wide Area Network (WAN), one or more internetworks such as the public Internet, a cellular network and the like.

In some embodiments, the server computer 105 may be any computing device, including but not limited to, servers, racks, work stations, personal computers, general purpose computers, laptops, Internet appliances, wireless devices, wired devices, multi-processor systems, minicomputers, and the like. Although FIG. 1 shows a single computing element, the server computer 105 may broadly represent one or multiple server computers, such as a server cluster, and the server computer 105 may be located in one or more physical locations. Also, the server computer 105 may represent one or more virtual computing instances that are executed using one or more computers in a datacenter such as a virtual server farm.

In some embodiments, the server computer 105 may also host or execute a network analytics application. Additionally, or alternatively, the server computer 105 may be a database server that manages the database 107. Further, the server computer 105 may include other applications, software, and other executable instructions, such as a database interface, to facilitate various aspects of embodiments described herein.

In some embodiments, the database 107 may be a data storage subsystem consisting of programs and data that is stored on any suitable storage device such as one or more Hard Disk Drives (HDDs), memories, or any other electronic digital data recording device configured to store data. Although database 107 is depicted as a single device in FIG. 1, the database 107 may span multiple devices located in one or more physical locations. For example, the database 107 may include one or more nodes located at a data warehouse(s). Additionally, the database 107 may be located on the same device(s) as the server computer 105. Alternatively, the database 107 may be located on a separate device(s) from the server computer 105.

In some embodiments, the database 107 may be in any format, such as a relational database, a Non-Structured Query Language (NoSQL) database, or any other format. Optionally, the database 107 may be communicatively connected with other components, either directly or indirectly, such as one or more third-party data suppliers. Generally, the database 107 may store the data related to network analytics including, but not limited to, network telemetry information and temporal graph data.

Figure 2:
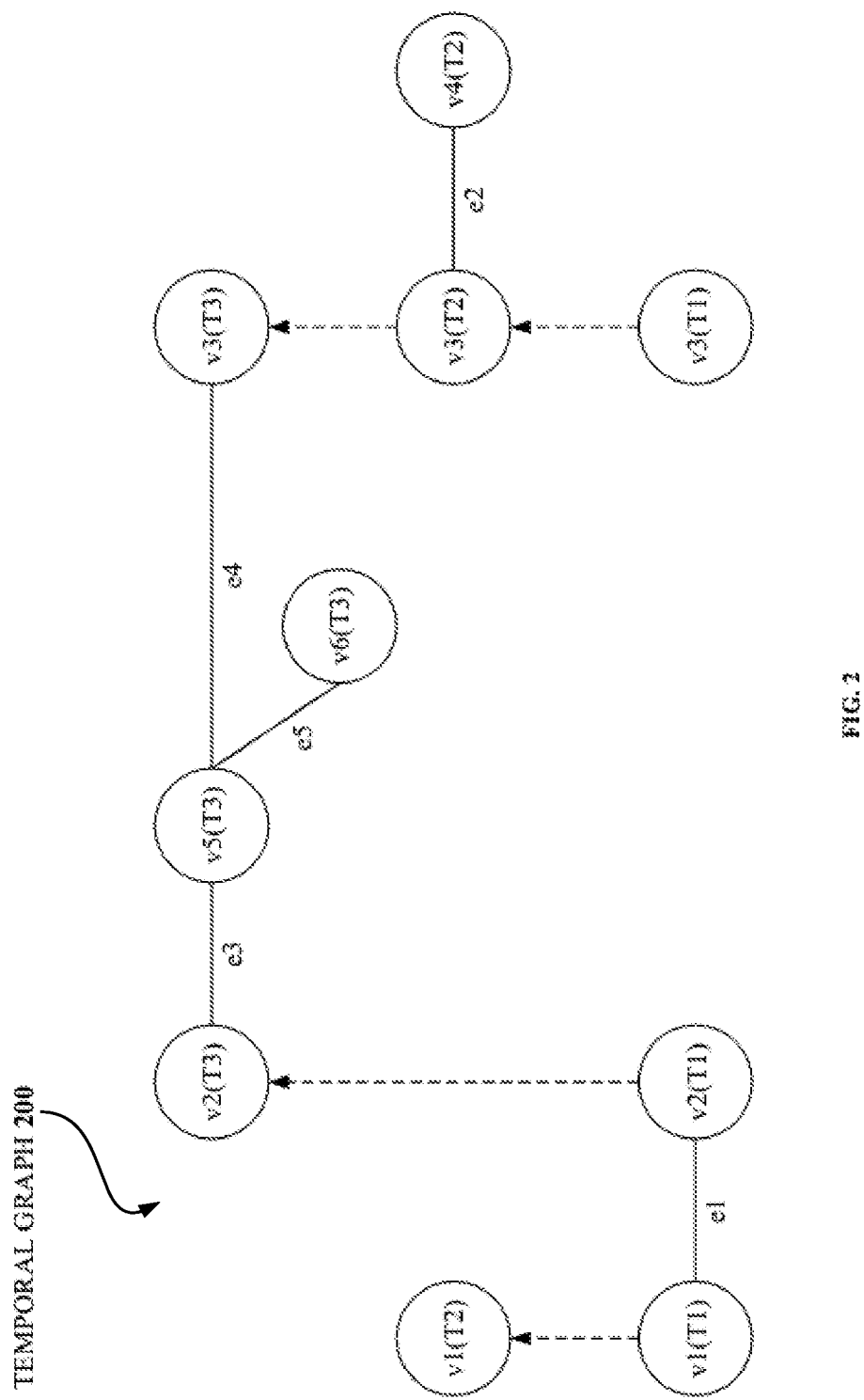
FIG. 2 is a diagram of an example temporal graph, according to various embodiments of the present disclosure.

FIG. 2 is a diagram of an example temporal graph 200, according to various embodiments of the present disclosure.

In some embodiments, a temporal graph 200 may be a graph that is capable of storing time information in association with each vertex and/or each edge in the graph. Like non-temporal graphs, the temporal graph 200 may comprise a plurality of vertices and a plurality of edges. Further, the temporal graph 200 may be used to store the information contained in a non-temporal graph. Additionally, each graph element may be associated with time information, indicating a time at which the graph element was created, modified, or removed.

In some embodiments, the temporal graph 200 may store one or more versions of the same graph element. However, when a graph element is modified or removed, a previous version of the graph element may be retained. A subsequent version of the graph element may reflect the modification or deletion. Further, the subsequent version may be associated with time information, indicating when the subsequent version was created. In other words, each version of a graph element corresponds to the state of the graph element at a given point in time.

In some embodiments, the temporal graph 200 may comprise vertices v1, v2, v3, v4, v5, and v6, and edges e1, e2, e3, e4, and e5. The temporal graph 200 may comprise one or more versions of each graph element. Each version of the graph element may be associated with one of a time T1, time T2, or time T3.

In some embodiments, as indicated in FIG. 2, at time T1, the temporal graph 200 may include a first version of vertices v1, v2, and v3. In addition, vertices v1 and v2 may be connected by an edge e1. At time T2, the temporal graph

200 may include a second version of the vertex v1. The second version of the vertex v1 may be associated with time T2. Also, the second version of vertex v1 may be temporally connected with the first version of vertex v1, as denoted by dotted lines in FIG. 2. It may be observed that vertex v2 and edge e1 did not change at time T2, and hence, the second version of vertex v1 remains connected to the first version of vertex v2 by the first version of edge e1. Additionally, the temporal graph 200 may include a second version of vertex v3 that is associated with time T2. The temporal graph 200 may include two additional vertices, v3 and v4, and an additional edge, v2, at time T2.

In some embodiments, in order to process and analyze the network telemetry information, the network telemetry information for the computer network may be transformed into the temporal graph 200. A computing device such as the client computing device or the server computer may receive network telemetry information, analyze the network telemetry information to identify network devices and network flows, and generate the temporal graph 200 based on the network telemetry information. In some embodiments, based on the type of network analytics to be performed using the temporal graph 200, or the type of information to be derived, different portions of the network telemetry information may be converted into temporal graph data. For example, if bandwidth consumption is being analyzed, then the network telemetry information that describes bandwidth usage may be transformed into temporal graph data, while network telemetry information that is not related to bandwidth consumption is not included in the temporal graph 200.

Partitioning of the Temporal Graph:

In some embodiments, the temporal graph 200 may be partitioned using a two-level approach, namely, partitioning the temporal graph 200 over a spatial domain and partitioning the temporal graph 200 over a temporal domain. That is, according to embodiments of the present disclosure, the temporal graph 200 and/or the graph elements may be partitioned in both the spatial domain and the temporal domain In some embodiments, the spatial partitioning of the temporal graph 200 may involve optimal distribution of the graph elements across a plurality of storage blocks, and a plurality of shards within each of the plurality of storage blocks. A detailed illustration of creation of the plurality of storage blocks and the plurality of shards within the plurality of storage blocks is provided in the subsequent paragraphs. Alternatively, the temporal partitioning may involve creating and maintaining a plurality of storage blocks for a predetermined, configurable time range.

A. Spatial Partitioning:

In some embodiments, the spatial partitioning of the temporal graph 200 may be performed based on one or more parameters including, but not limiting to, type of the graph elements, labels and label groups corresponding to the graph elements and element identifiers of the graph elements. As an example, the type of the graph element may be one of a vertex or an edge. In some embodiments, each of the graph elements that represent at least one of an interconnecting device of the computer network or a metric element, representing operational information related to the interconnecting device, may be classified as the elements of type 'vertex'. Similarly, each of the graph elements that represent a relationship between the interconnecting devices of the computer network may be classified as the elements of type 'edge'.

The label of the graph element may be a unique name, or a unique characteristic classifier associated with each of the graph elements. In some embodiments, the label of the graph element may be dynamically configurable and may be defined based on nature of the telemetry information and/or a domain to which the telemetry information belongs. As an example, the domain may be 'network bandwidth'. Here, a graph element that is associated with information related to bandwidth of the computer network may be classified under the domain 'network bandwidth' and assigned a label such as 'Bandwidth 1'. Subsequently, all the graph elements that are associated with the information related to the network bandwidth may be labelled as 'Bandwidth 2', 'Bandwidth 3', . . . and the like. Further, a label group with a group name such as 'network bandwidth' may be created for collectively including all the graph elements that store information related to the network bandwidth and have similar and/or related labels. In the above example, each of the graph elements with labels 'Bandwidth 1', 'Bandwidth 2', . . . and the like may be included in the label group 'network bandwidth'. That is, a plurality of graph elements that are associated with bandwidth information of multiple interconnecting devices of the computer network may have a similar label and hence may be classified under a single label group. In other words, each label group is a cohesive set of graph elements having same or inter-related labels.

The element identifier or element ID may be a unique ID assigned to each of the graph elements. In some embodiments, the element IDs may be used to identify the individual graph elements within the temporal graph 200.

Figure 3A:
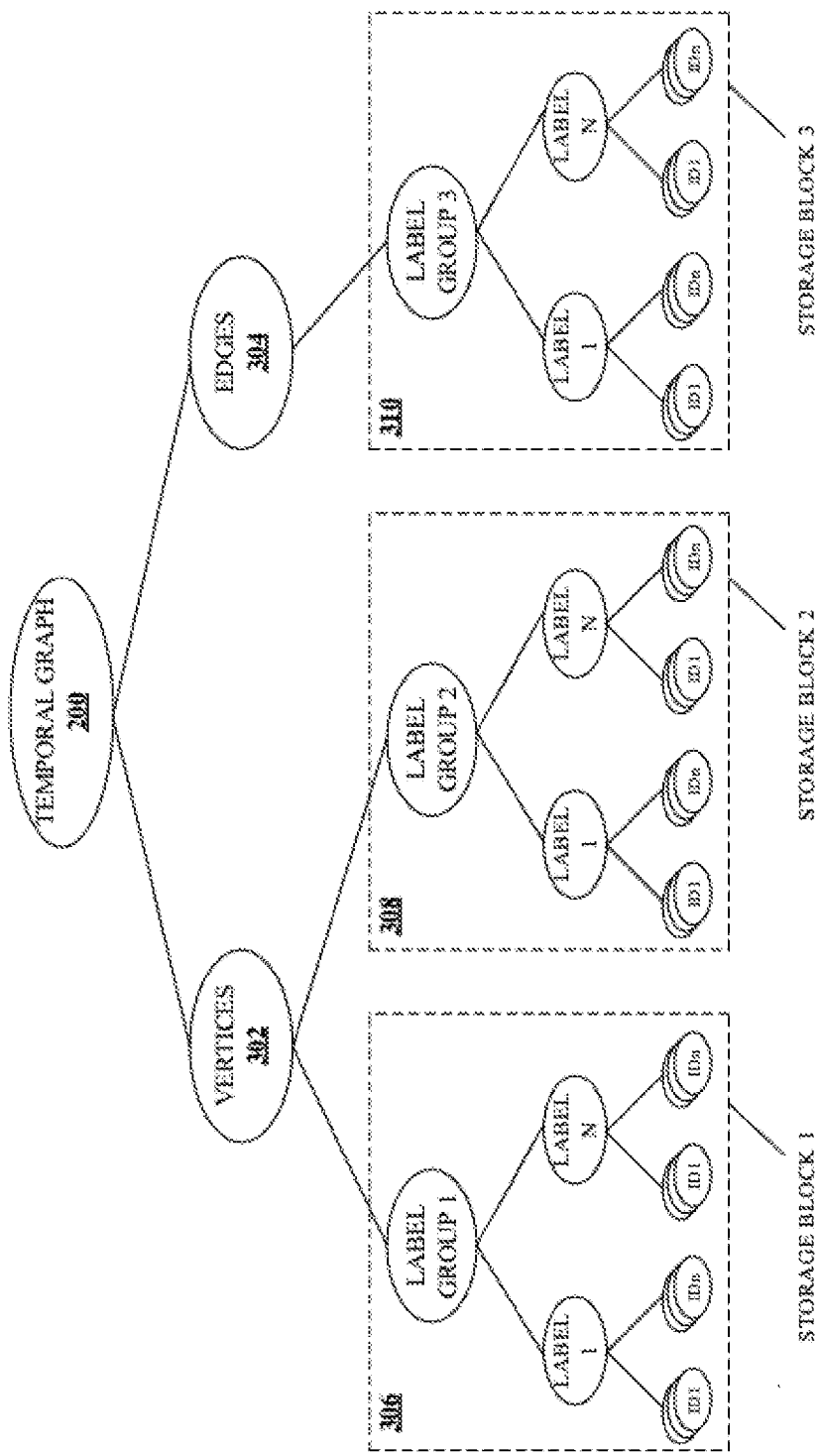
FIGS. 3A-3C provide example representation of the temporal graph structure, according to various embodiments of the present disclosure.

FIG. 3A provides an example illustration of spatial partitioning of a temporal graph 200 in accordance with various embodiments of the present disclosure.

In some embodiments, the temporal graph 200 may comprise a plurality of graph elements of different types, namely, vertices 302 and edges 304. Here, spatially partitioning the temporal graph 200 comprises creating a plurality of storage blocks for storing the data elements corresponding to each type of the graph elements and each label group of the data elements. That is, a distinct set of plurality of storage blocks may be created for separately storing the data items classified as the vertices 302 and the edges 304. Further, in some embodiments, each of the plurality of storage blocks classified under each type of the graph elements may be configured to store data elements belonging to a single label group. That is, each of the plurality of storage blocks may store a plurality of data elements belonging to a single label group and/or having related labels.

Accordingly, FIG. 3A illustrates spatial partitioning of the temporal graph 200 by creating three storage blocks, namely, storage block 1 306, storage block 2 308 and storage block 3 310. Here, the storage block 1 306 and storage block 2 308 may be created for storing the data elements of type 'vertices' Similarly, the storage block 3 310 may be created for storing the data elements of type 'edges'. In some embodiments, the number of storage blocks created for storing the data elements of each type may not be limited to the three storage blocks as illustrated in FIG. 3A. Alternatively, any number of storage blocks may be dynamically created based on requirement and/or size of the telemetry information.

In some embodiments, as illustrated in FIG. 3A, the storage block 1 306 may be configured to store data elements belonging to a label group 1. Similarly, the storage block 2 308 and storage block 3 310 may be configured for storing the data elements of belonging to label group 2 and label group 3 respectively. Further, within each of the storage blocks (storage block 1, storage block 2 and storage block 3), the individual data elements may be stored along with their labels, namely label 1, label 2, ..., label N. Furthermore, one or more distinct versions of each of the data elements may be stored with unique element Identifiers (IDs), namely ID1, ID2, ... IDn.

In some embodiments, spatially partitioning the temporal graph 200 further comprises sharding each of the plurality of storage blocks into a plurality of shards based on a configurable sharding count. Sharding involves creating a plurality of shards within the plurality of storage blocks based on the element IDs corresponding to the data elements stored within the plurality of storage blocks. In some embodiments, each of the plurality of shards may store one or more data elements that are randomly selected using a predefined technique such as a consistent hashing technique. Further, the number of shards to be created within the plurality of storage blocks may be determined based on size of the plurality of storage blocks. Similarly, the number of data elements to be stored within each of the plurality of shards may be a configurable value, namely the 'sharding count'. In some embodiments, sharding the plurality of storage blocks helps in optimal distribution of the data elements within the plurality of storage blocks.

Figure 3B:
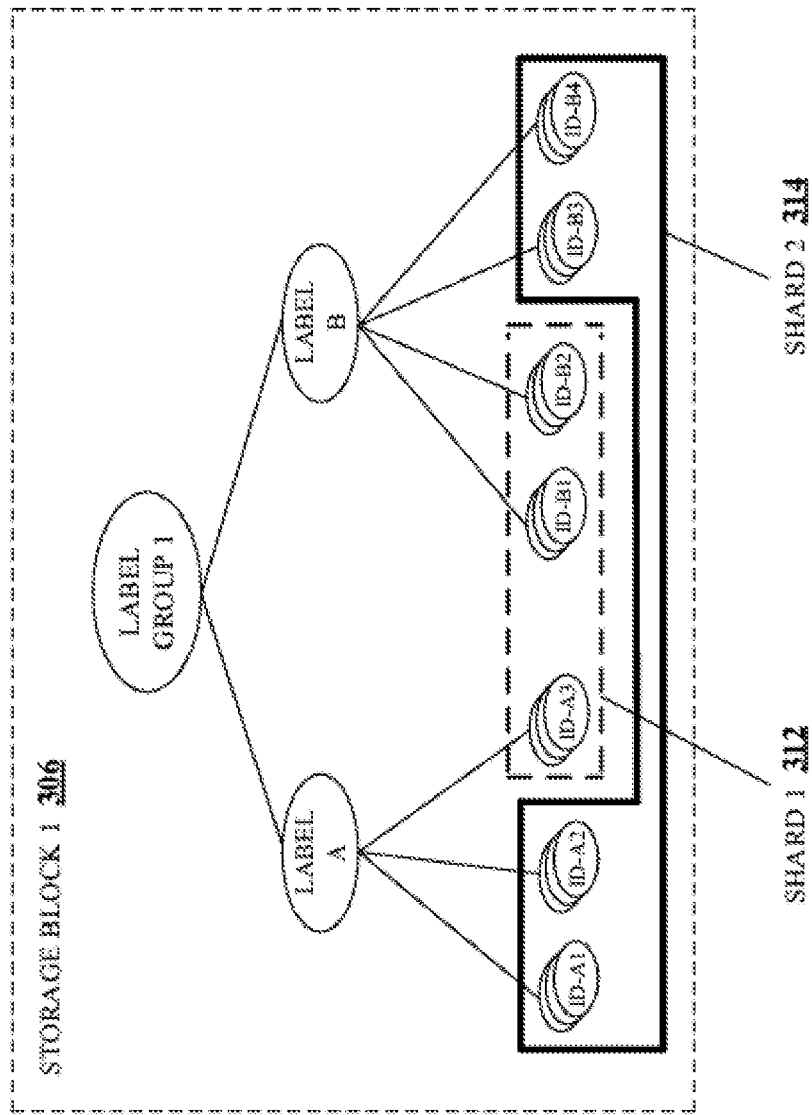

FIG. 3B provides an example illustration of sharding the storage block 1 306 in accordance with some embodiments of the present disclosure. Suppose, the label group 1 306 comprises two inter-related labels namely, label A and label B. Suppose, label A is associated with the data elements having element IDs—ID-A1, ID-A2 and ID-A3 Similarly, suppose label B is associated with the data elements having element IDs—ID-B1, ID-B2, ID-B3 and ID-B4. In some embodiments, the storage block 1 306 with the above classification, may be sharded to create two distinct shards namely, shard 1 312 and shard 2 314. Here, shard 1 312 may be configured to store the data elements identified by ID-A3, ID-B1 and ID-B2. Similarly, shard 2 314 may be configured to store the data elements identified by ID-A1, ID-A2, ID-B3 and ID-B4. In some embodiments, the one or more data elements to be stored within shard 1 312 and shard 2 314 may be selected based on the predefined selection technique such as the consistent hashing technique. Thus, as illustrated in FIG. 3B, sharding ensures a horizontal distribution of the data elements comprised in the storage block 1 306.

B. Temporal Partitioning:

In some embodiments, the temporal partitioning of the temporal graph 200 may be performed based on a time range associated with the graph elements. Further, the temporal partitioning of the temporal graph 200 may involve rolling over the plurality of storage blocks based on a configurable rollover time. In some embodiments, rolling over of a storage block includes moving existing data elements of the storage block into a different storage space for emptying and/or freeing-up the storage space in the storage blocks. Additionally, or alternatively, rolling over an existing storage block may include creating a new storage block, having same specifications of the existing storage block, in place of the existing storage block. In other words, rolling over of the storage blocks ensures that an empty storage space is always available for the incoming and/or new telemetry information. Additionally, rolling over may also ensure that the data elements that are no longer required to be stored in the storage blocks are automatically freed-up from the storage space. In some embodiments, the configurable rollover time may be a time period, upon expiry of which, the plurality of storage blocks may be rolled over. That is, after the rollover time is elapsed, the plurality storage blocks may be rolled over into a new storage block. As an example, the rollover time may be a time period such as one day, one week and the like. In some embodiments, the rollover time specifications may be dynamically changed/configured based on storage requirements of the telemetry information.

In some embodiments, temporally partitioning the temporal graph 200 comprises associating each of the plurality of storage blocks with a predefined time-range corresponding to the data elements. As an example scenario, suppose, the predefined time-range is 1 day. In this scenario, each of the plurality of storage blocks may be associated with the time-range of 1 day, which means that the plurality of storage blocks is configured to store the data elements that have been generated within the specified time-range of 1 day. In other words, the plurality of storage blocks may be rolled over on each single day, and the data elements that are generated on different days are stored on different storage blocks. Thus, temporal partitioning ensures that the plurality of storage blocks is configured to store the telemetry information and/or data elements generated in a specific predefined time-range.

Figure 3C:
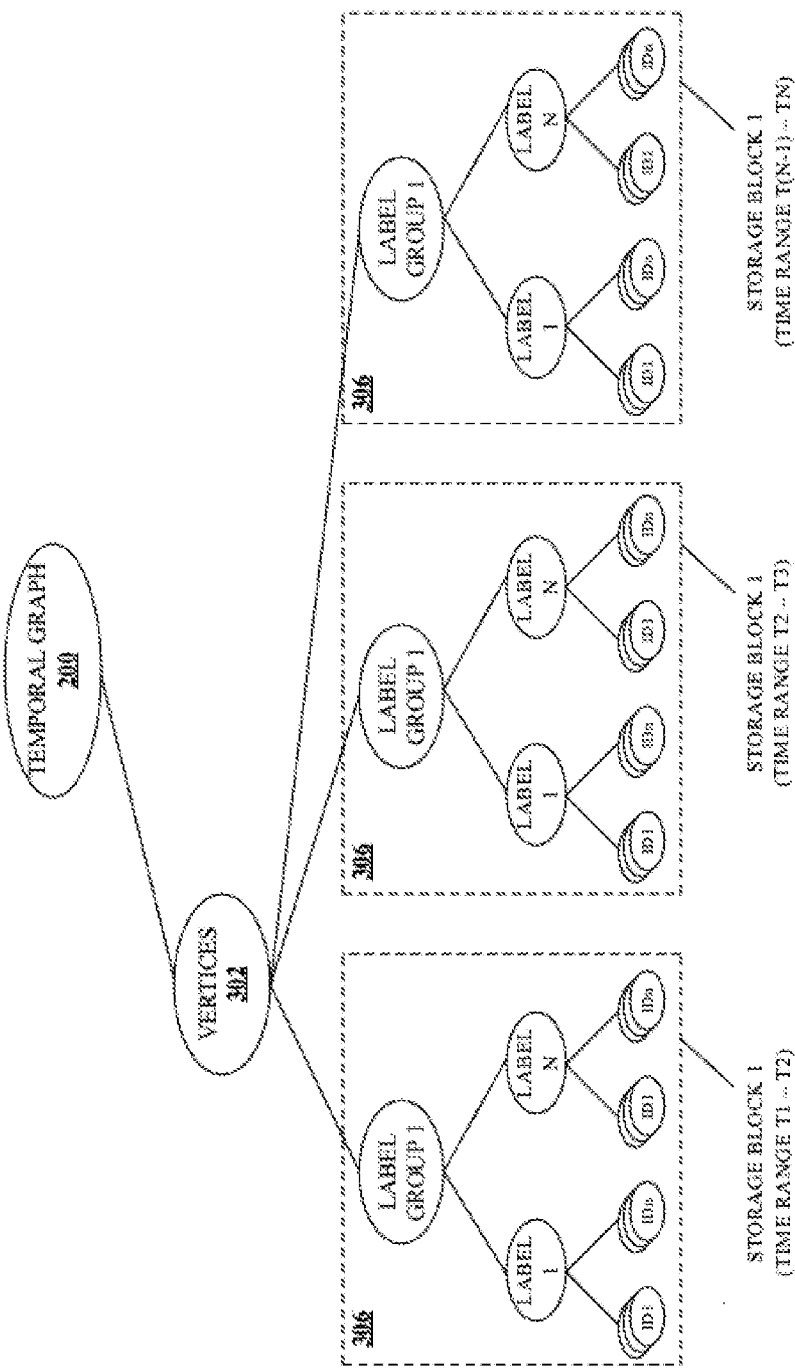

FIG. 3C shows an example illustration of temporal partitioning of the temporal graph 200 in accordance with various embodiments of the present disclosure. For example, the storage block 1 306 may be configured to store the data elements generated at the predefined time ranges T1-T2, T2-T3, ..., T(N−1)-TN. In other words, the storage block 1 306 may be rolled over at the expiry of each of the time ranges T1-T2, T2-T3, ..., T(N−1)-TN, which ensures that each instance of the storage block 1 306 stores the data elements generated within the corresponding time ranges T1-T2, T2-T3, ..., and T(N−1)-TN. That is, initially, during time range T1-T2 the storage block 1 306 stores only the data elements that are generated during the time range T1-T2. Subsequently, at the end/expiry of time range T1-T2, which is the beginning of time range T2-T3, the storage block 1 306 may be rolled over and configured to store only the data elements that are generated during the time range T2-T3.

Figure 4:
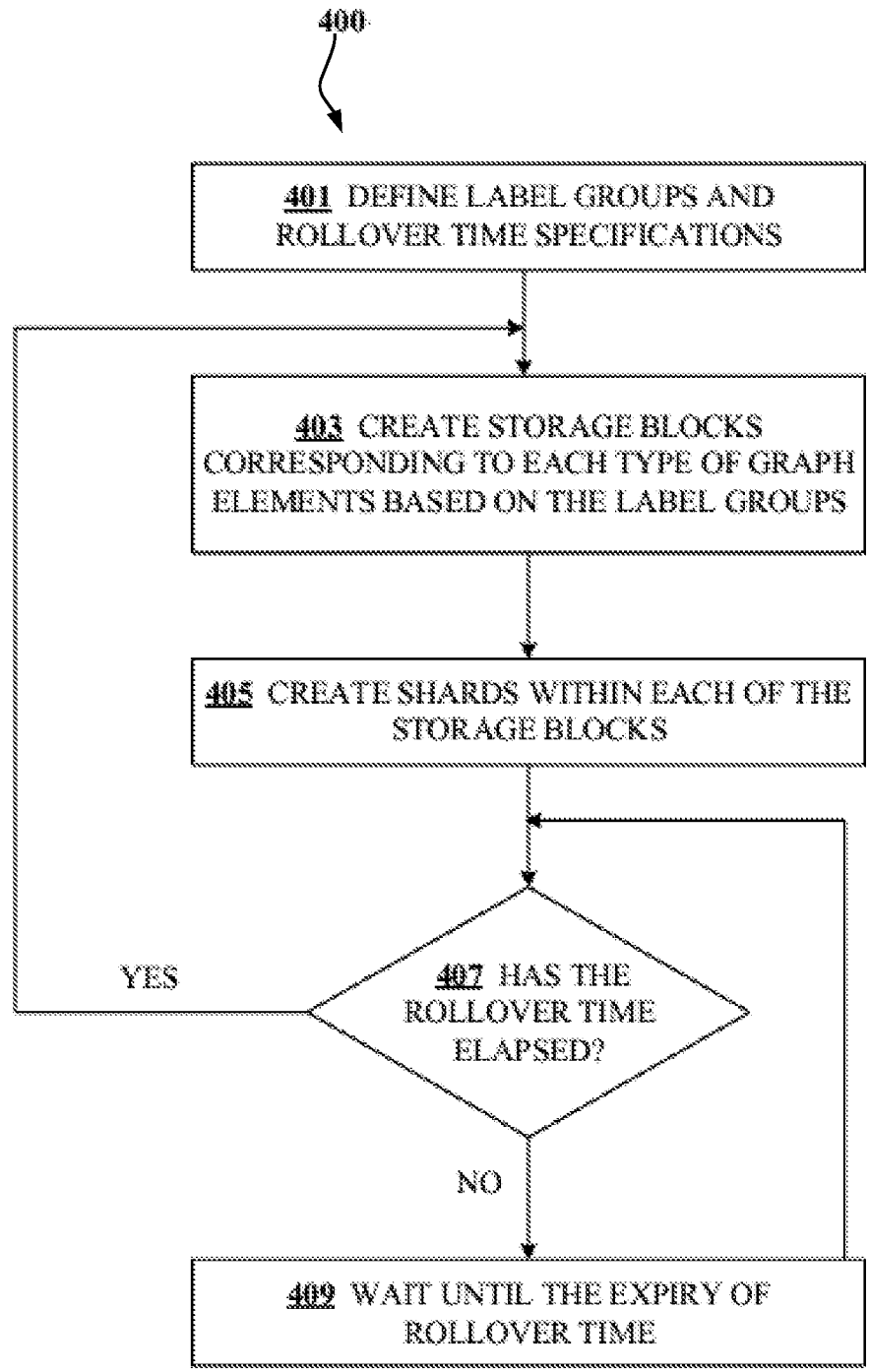
FIG. 4 is a flowchart of an example process for partitioning the temporal graph, according to various embodiments of the present disclosure.

FIG. 4 summarizes an example method of spatially and temporally partitioning the temporal graph in accordance with the illustrations provided in the above paragraphs. At step 401, the method 400 comprises defining various parameters including, but not limited to, label groups and rollover time specifications required for partitioning the temporal graph. In some embodiments, the label groups may be defined based on the application and/or nature of the telemetry information to be stored in the temporal graph. Similarly, the rollover time may be defined based on the storage requirements associated with the temporal graph. In some embodiments, the label groups and the rollover time specifications may be defined by users of the database, such as a database administrator operating from the server computer.

Upon defining the label groups and the rollover time specifications, the method 400, at step 403, may create a plurality of storage blocks for storing each type of the different types of graph elements based on the predefined label groups. In some embodiments, each of the plurality of storage blocks may be configured to store the telemetry information generated in a specific predefined time-range.

In some embodiments, subsequent to creating the plurality of storage blocks, the method 400, at step 405 comprises sharding each of the plurality of storage blocks into a plurality of shards based on a configurable sharding count. That is, the configurable sharding count may specify the number of shards to be created within each of the plurality of storage blocks. In some embodiments, the configurable sharding count may be varied depending on the size of the plurality of storage blocks.

Further, at step 407, the method 400 comprises verifying whether the rollover time has been elapsed. In some embodiments, if the rollover time has elapsed, then the method 400 comprises re-creating and/or rolling over the plurality of storage blocks based on the label groups, as shown in step 403. Alternatively, if the rollover time has not elapsed, then the method 400, at step 409, comprises waiting until the expiry of the rollover time to initiate rollover of the plurality of storage blocks. Verifying the expiry of rollover time and re-creating the storage blocks upon expiry of the rollover time ensures that distinct storage blocks are created for storing the data elements generated at corresponding distinct time ranges.

Figure 5:
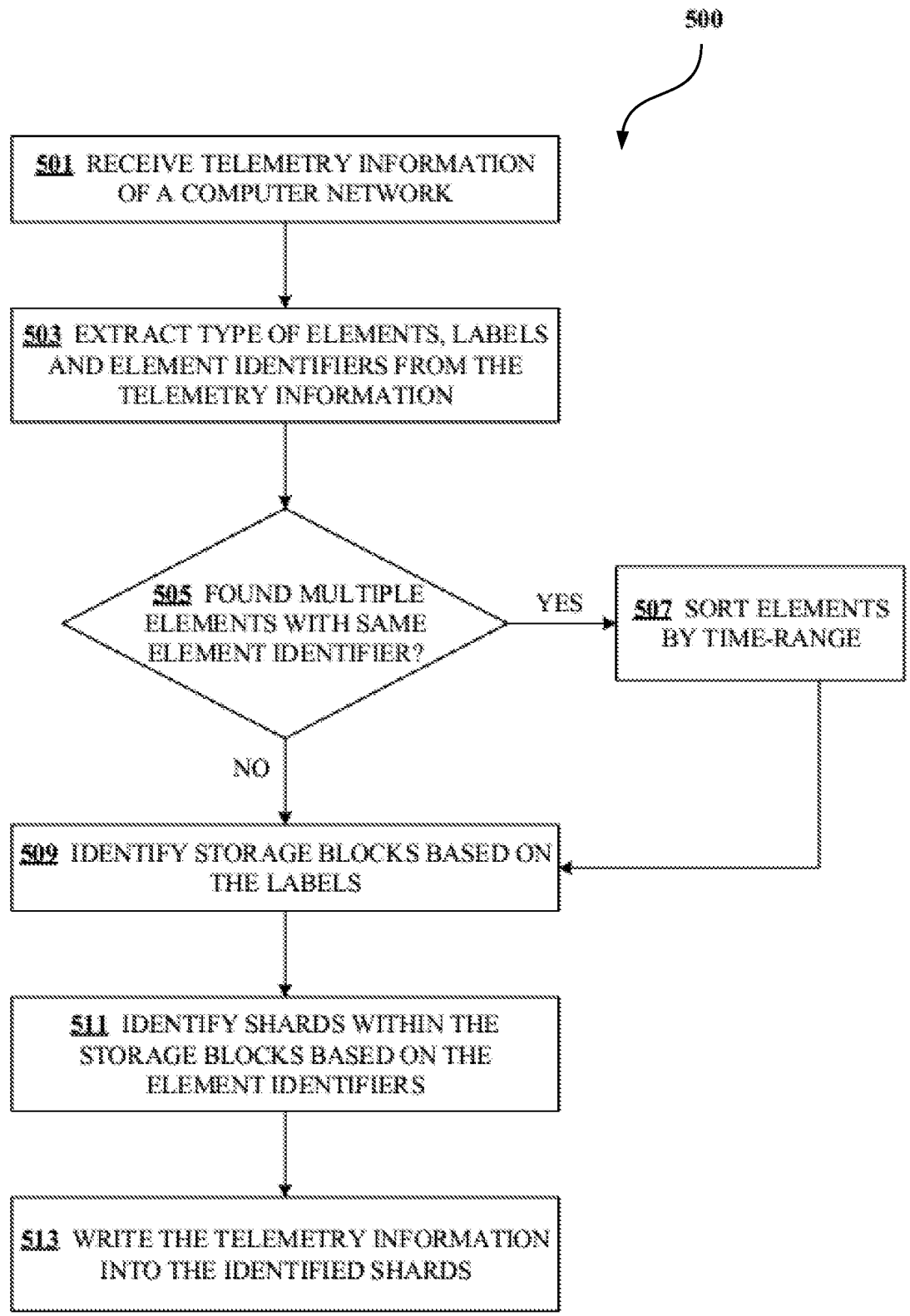
FIG. 5 is a flowchart of an example process for writing/storing the telemetry information into a partitioned temporal graph, according to various embodiments of the present disclosure.

FIG. 5 is a flowchart of an example process for writing/storing the telemetry information into a partitioned temporal graph, according to various embodiments of the present disclosure.

At step 501, the method 500 comprises receiving telemetry information to be processed and stored in the temporal graph from a computer network connected to a client computing device. Further, at step 503, the method 500 comprises extracting information including, without limiting to, type of the graph elements and/or data elements of the telemetry information, labels of the graph elements and element identifiers corresponding to the graph elements from the telemetry information. Subsequently, at step 505, the method 500 comprises scanning through the extracted information to verify if more than one graph element is identified with the same element identifier. In some embodiments, if more than one graph element is identified with the same element identifier, then the identified graph elements may be sorted according to a time range corresponding to each of the identified graph elements, as shown in step 507. Further, if there are no graph elements with the same element identifiers, then at step 509, the method 500 proceeds to identify a storage block for storing the graph element based on the label corresponding to the graph element. That is, the label of the graph element may be used for identifying a label group corresponding to the graph element, which in turn, may be used for identifying the storage block corresponding to the graph element.

In some embodiments, subsequent to identifying the storage blocks, at step 511, the method 500 comprises identifying one or more shards within the identified storage block for storing the graph element. The one or more shards may be identified based on the element identifiers corresponding to the graph element. Finally, at step 513, the graph element may be written into the identified one or more shards within the identified storage block.

Figure 6:
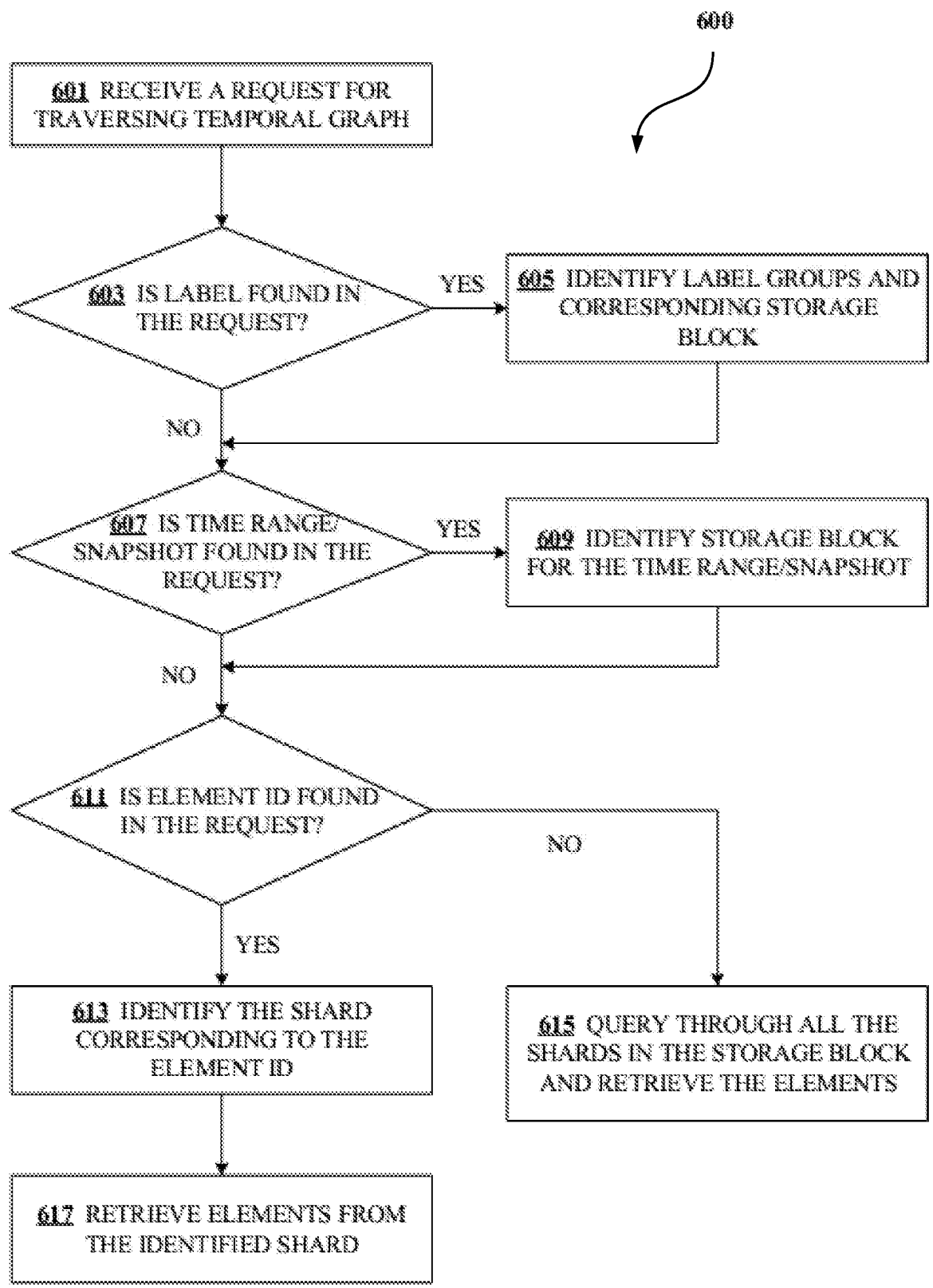
FIG. 6 is a flowchart of an example process for querying/retrieving telemetry information from a partitioned temporal graph, according to various embodiments of the present disclosure.

FIG. 6 is a flowchart of an example process for querying/retrieving telemetry information from a partitioned temporal graph, according to various embodiments of the present disclosure.

In some embodiments, querying/retrieving telemetry information stored in the temporal graph may be initiated in response to a request for traversing the temporal graph, received at step 601. As an example, the request for traversal of the temporal graph may be received from the client computing device or the server computer. At step 603, the method 600 comprises verifying if the request and/or the query for traversing the temporal graph comprises/specifies a label of the graph element to be retrieved. In some embodiments, if the request comprises the label of the graph element, then, at step 605, the method 600 comprises identifying a label group corresponding to the label mentioned in the request. Also, step 605 comprises identifying a storage block corresponding to the identified label group of the graph element.

Subsequently, at step 607, the method 600 comprises determining if a time-range and/or a snapshot of the requested graph element is specified in the request. In some embodiments, if the request comprises/specifies the time range or the snapshot corresponding to the requested graph element, then the method 600, at step 609, comprises identifying a storage block corresponding to the time-range/snapshot specified in the request. Thereafter, at step 611, the method 600 comprises verifying if an element ID corresponding to the requested graph element is specified in the request. In some embodiments, if the element ID is specified in the request, then at step 613, the method 600 comprises identifying one or more shards corresponding to the element ID specified in the request. Thereafter, at step 617, the method 600 comprises retrieving the data elements and the telemetry information stored in the identified one or more shards. Alternatively, if the element ID is not specified in the request, then the method 600, at step 615, comprises querying through each of the one or more shards stored in the identified storage block for retrieving the telemetry information. Thus, the telemetry information may be retrieved from the temporal graph using at least one of the labels of the graph elements, time-range/timestamp of the graph elements or the element IDs corresponding to the graph elements. In some embodiments, the time required for querying the temporal graph may be reduced if all the above parameters are specified in the request, since the traversal of the temporal graph is narrowed down.

In some embodiments, partitioning of the temporal graph over a spatial domain and a temporal domain helps in efficient storage and retrieval of the telemetry information. Further, embodiments of the present disclosure use spatial and temporal alignment of the plurality of storage blocks to ensure that each of the plurality of storage blocks store data of a limited size. Limiting the size of the plurality of storage blocks, in turn, automatically limits size of partitions in the database and hence improves writing and indexing speeds of the graph elements. Furthermore, the present disclosure improves efficiency of the data read operations by a great extent, since the storage blocks are narrowed down before even performing the actual data lookup and/or traversal of the graph.

Implementation Example—Hardware Overview

Figure 7:
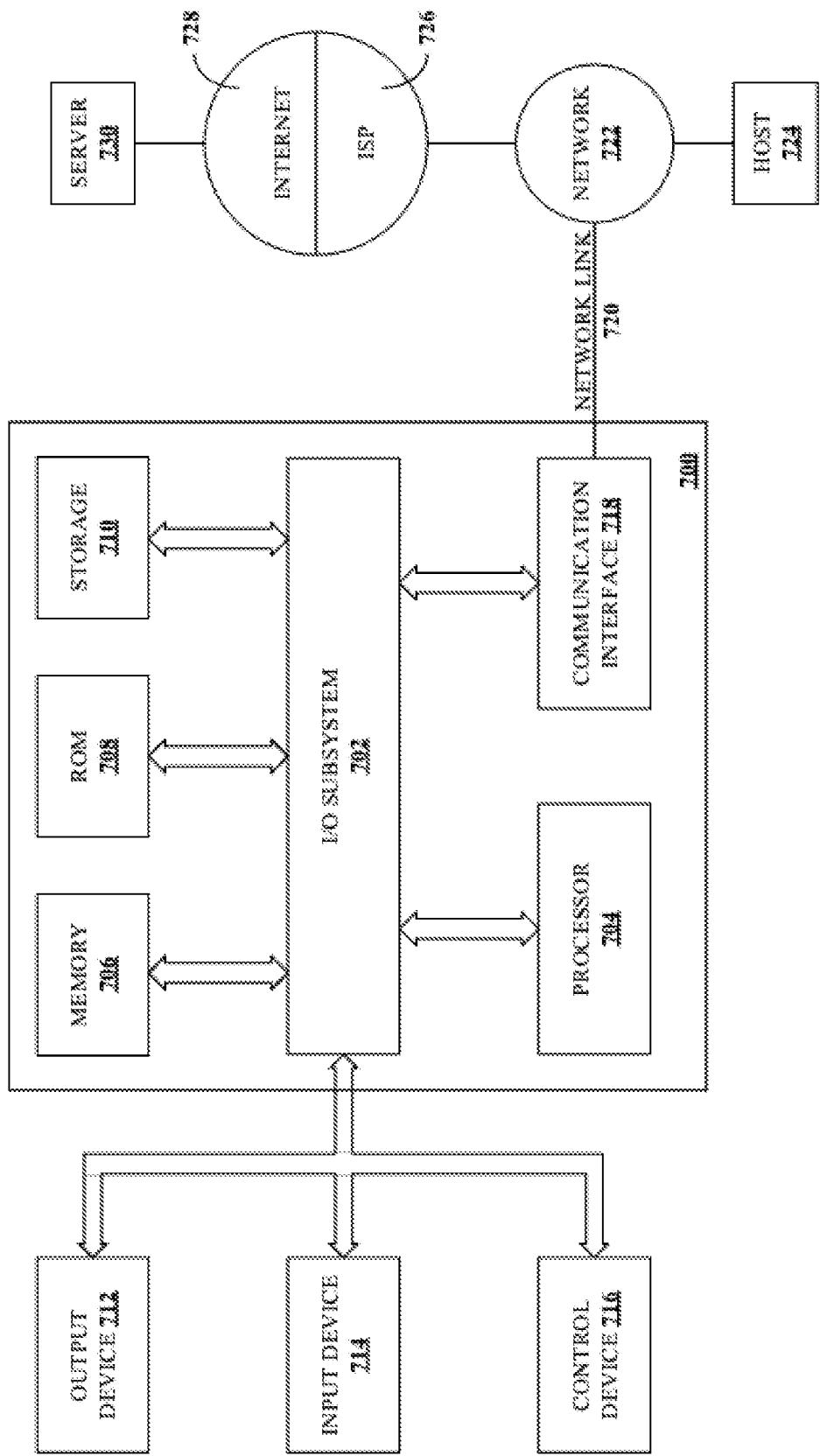
FIG. 7 is a block diagram that illustrates an example computer system upon which an embodiment of the present disclosure may be implemented.

FIG. 7 is a block diagram that illustrates an example computer system upon which an embodiment of the invention may be implemented.

In some embodiments, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one Application-Specific Integrated Circuit (ASIC) or Field Programmable Gate Array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

In some embodiments, the computer system 700 may include an Input/Output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

In some embodiments, at least one hardware processor 704 may be coupled to I/O subsystem 702 for processing information and instructions. The hardware processor 704 may include, for example, a general-purpose microprocessor or microcontroller and/or a special-purpose microprocessor such as an embedded system or a Graphics Processing Unit (GPU) or a digital signal processor or ARM processor. The hardware processor 704 may comprise an Integrated Arithmetic Logic Unit (ALU) or may be coupled to a separate ALU.

In some embodiments, the computer system 700 may include one or more units of memory 706, such as a main memory, which is coupled to I/O subsystem 702 for electronically digitally storing data and instructions to be executed by processor 704. The memory 706 may include volatile memory such as various forms of Random-Access Memory (RAM) or other dynamic storage device. The memory 706 also may be used for storing temporary variables or other intermediate information during execution of instructions to be executed by processor 704. Such instructions, when stored in non-transitory computer-readable storage media accessible to processor 704, may render the computer system 700 into a special-purpose machine that is customized to perform the operations specified in the instructions.

In some embodiments, the computer system 700 may further include non-volatile memory such as Read Only Memory (ROM) 708 or other static storage device coupled to I/O subsystem 702 for storing information and instructions for processor 704. The ROM 708 may include various forms of Programmable ROM (PROM) such as Erasable PROM (EPROM) or Electrically Erasable PROM (EEPROM). A unit of persistent storage 710 may include various forms of Non-Volatile RAM (NVRAM), such as FLASH memory, or solid-state storage, magnetic disk or optical disk such as Compact Disc ROM (CD-ROM) or Digital Versatile Disk ROM (DVD-ROM) and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

In some embodiments, the instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hyper Text Transfer Protocol (HTTP) or other communication protocols; file format processing instructions to parse or render files coded using Hypertext Markup Language (HTML), eXtensible Markup Language (XML), codes of Joint Photographic Experts Group (JPEG), codes of Moving Pictures Experts Group (MPEG) or Portable Network Graphics (PNG); user interface instructions to render or interpret commands for a Graphical User Interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using Structured Query Language (SQL) or no SQL, an object store, a graph database, a flat file system or other data storage.

In some embodiments, the computer system 700 may be coupled via I/O subsystem 702 to at least one output device 712. In one embodiment, output device 712 may be a digital computer display. Examples of a display that may be used in various embodiments include a touch screen display or a Light-Emitting Diode (LED) display or a Liquid Crystal Display (LCD) or an e-paper display. The computer system 700 may include other type(s) of output devices 712, alternatively, or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

In some embodiments, another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to the processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, the computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

In some embodiments, when the computer system 700 is a mobile computing device, the input device 714 may comprise a Global Positioning System (GPS) receiver coupled to a GPS module that is capable of triangulating to a plurality of GPS satellites, determining and generating geolocation or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host computer 724 or the server 730.

In some embodiments, the computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

In some embodiments, the term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like. Further, the storage media may be distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infrared data communications.

In some embodiments, various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

In some embodiments, the computer system 700 also includes a communication interface 718 coupled to the I/O subsystem 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

In some embodiments, the network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724. Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server 730 may be coupled to internet 728. The server 730 may broadly represent any computer, data center, virtual machine or virtual computing instance with or without a hypervisor, or computer executing a containerized program system such as Docker or Kubernetes. Server 730 may represent an electronic digital service that is implemented using more than one computer or instance and that is accessed and used by transmitting web services requests, Uniform Resource Locator (URL) strings with parameters in HTTP payloads, Application Program Interface (API) calls, app services calls, or other service calls.

In some embodiments, the computer system 700 may send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

In some embodiments, the execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In some embodiments, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In some embodiments, for security and reliability, an operating system may prevent direct communication between independent processes, providing strictly mediated and controlled interprocess communication functionality.

In summary, a method for partitioning a temporal graph is described. in some embodiments, the present technologies comprises creating a plurality of storage blocks for each type of the different types of graph elements based on predefined label groups, each of the plurality of storage blocks configured to store the telemetry information generated in a corresponding predefined time-range, recreating each of the plurality of storage blocks upon expiry of a configurable rollover time, and sharding each of the plurality of storage blocks into a plurality of shards based on a configurable sharding count.

In some embodiments, the present technology pertains to partitioning a temporal graph comprising different types of graph elements including vertices and edges that are duplicated for multiple time periods, and pertains to storing telemetry information of a computer network over the multiple time ranges.

The partitioning can be performed by creating a plurality of storage blocks that include telemetry information stored in association with a subset of the graph elements that are assigned to one of a plurality of predefined label groups and that fall into a first time range from the multiple time ranges. The partitioning can also include recreating the plurality of storage blocks for a second time range such that the plurality of storage blocks for the second time range includes data stored in the same subset of graph elements but the data is from the second time range.

The partitions can further be sharded. This can include sharding each of the plurality of storage blocks including the storage blocks from the first time range, and the storage blocks from the second time range into a plurality of shards based on a configurable sharding count.

What is claimed is:

1. A method comprising:
   partitioning a temporal graph comprising different types of graph elements including vertices and edges, for storing telemetry information of a computer network, the partitioning comprising:
   creating a plurality of storage blocks for each type of the different types of graph elements based on predefined label groups, wherein each of the plurality of storage blocks is configured to store the telemetry information generated in a corresponding predefined time-range, wherein each of the plurality of storage blocks are recreated upon expiry of a configurable rollover time; and
   sharding each of the plurality of storage blocks into a plurality of shards based on a configurable sharding count.

2. The method of claim 1, wherein each of the vertices represent at least one of interconnecting devices in the computer network or metric elements representing operational information related to the interconnecting devices.

3. The method of claim 1, wherein each of the edges represent a relationship between interconnecting devices in the computer network.

4. The method of claim 1, wherein the telemetry information of the computer network comprises device state information of interconnecting devices in the computer network and network state information related to data packet flow through the computer network.

5. The method of claim 1, wherein each of the predefined label groups include a plurality of graph elements belonging to a domain and having related labels.

6. The method of claim 1 further comprising:
   receiving a request for traversing the temporal graph;
   identifying a storage block from the plurality of storage blocks based on at least one of labels corresponding to the graph elements or a time-range associated with the graph elements, wherein the labels and the time-range are extracted from the request;
   identifying a shard from the plurality of shards comprised in the identified storage block based on an element identifier specified in the request; and
   retrieving the telemetry information stored in the identified shard, in response to the request for traversing the temporal graph.

7. A method comprising:
   receiving telemetry information of a computer network for storing in a temporal graph comprising different types of graph elements including vertices and edges, wherein the temporal graph is partitioned into a plurality of storage blocks for storing each type of the different types of graph elements, wherein each of the plurality of storage blocks are partitioned into a plurality of shards;
   extracting information comprising type of the graph elements, labels corresponding to the graph elements and element identifiers corresponding to the labels of the graph elements, from the telemetry information;
   identifying one or more storage blocks from the plurality of storage blocks based on the labels corresponding to the graph elements;
   identifying one or more shards from the plurality of shards, comprised in the identified one or more storage blocks, based on the element identifiers corresponding to the labels of the graph elements; and writing the telemetry information into the identified one or more shards of the plurality of shards.

8. The method of claim 7, wherein each of the vertices represent at least one of interconnecting devices in the computer network or metric elements representing operational information related to the interconnecting devices.

9. The method of claim 7, wherein each of the edges represent a relationship between interconnecting devices in the computer network.

10. The method of claim 7, wherein the telemetry information of the computer network comprises device state information of interconnecting devices in the computer network and network state information related to data packet flow through the computer network.

11. The method of claim 7, wherein the one or more shards are identified by performing consistent hashing of the element identifiers.

12. The method of claim 7, wherein the element identifiers represent one or more versions of the telemetry information associated with the labels corresponding to the graph elements.

13. The method of claim 7, wherein identifying the one or more storage blocks comprises:
identifying one or more label groups corresponding to each of the labels; and
identifying storage blocks associated with each of the identified one or more label groups.

14. A computer system comprising:
one or more processors;
one or more non-transitory computer-readable media storing instructions which, when executed by the one or more processors, cause:
partitioning a temporal graph, comprising different types of graph elements including vertices and edges, to store telemetry information of a computer network, the partitioning comprising:
creating a plurality of storage blocks for each type of the different types of graph elements based on predefined label groups, wherein each of the plurality of storage blocks is configured to store the telemetry information generated in a corresponding predefined time-range; wherein each of the plurality of storage blocks are recreated upon expiry of a configurable rollover time; and
sharding each of the plurality of storage blocks into a plurality of shards based on a configurable sharding count.

15. The computer system of claim 14, wherein each of the vertices represent at least one of interconnecting devices in the computer network or metric elements representing operational information related to the interconnecting devices.

16. The computer system of claim 14, wherein each of the edges represent a relationship between interconnecting devices in the computer network.

17. The computer system of claim 14, wherein the telemetry information of the computer network comprises device state information of interconnecting devices in the computer network and network state information related to data packet flow through the computer network.

18. The computer system of claim 14, wherein each of the predefined label groups include a plurality of graph elements belonging to a domain and having related labels.

19. The computer system of claim 14 further comprising:
receiving a request to traverse the temporal graph;
identifying a storage block from the plurality of storage blocks based on at least one of labels corresponding to the graph elements or a time-range associated with the graph elements, wherein the labels and the time-range are extracted from the request;
identifying a shard from the plurality of shards comprised in the identified storage block based on an element identifier specified in the request; and
retrieving the telemetry information stored in the identified shard, in response to the request for traversing the temporal graph.

20. The computer system of claim 14 further comprising:
receiving telemetry information of a computer network to store in the temporal graph;
extracting information comprising type of the graph elements, labels corresponding to the graph elements and element identifiers corresponding to the labels of the graph elements, from the telemetry information;
identifying one or more storage blocks from the plurality of storage blocks based on the labels corresponding to the graph elements;
identifying one or more shards from the plurality of shards, comprised in the identified one or more storage blocks, based on the element identifiers corresponding to the labels of the graph elements; and
writing the telemetry information into the identified one or more shards of the plurality of shards.

* * * * *